United States Patent [19]
Kuhn

[11] Patent Number: 5,071,459
[45] Date of Patent: Dec. 10, 1991

[54] BUSHING BALANCE CONTROLLER FOR MULTIPLE SEGMENT BUSHINGS

[75] Inventor: John J. Kuhn, Gibsonia, Pa.
[73] Assignee: PPG Industries, Inc., Pittsburgh, Pa.
[21] Appl. No.: 530,681
[22] Filed: May 30, 1990
[51] Int. Cl.⁵ .............................................. C03B 37/07
[52] U.S. Cl. .............................................. 65/2; 65/29; 65/128; 65/162; 219/483; 219/497; 373/28; 373/40
[58] Field of Search .............. 65/1, 29, 128, 162, 65/2; 219/486, 483, 497; 374/141; 373/28, 40

[56] References Cited

U.S. PATENT DOCUMENTS

| | | | |
|---|---|---|---|
| 3,246,124 | 4/1966 | Trethewey | 219/501 |
| 3,540,001 | 11/1970 | Gormley et al. | 340/172.5 |
| 3,969,098 | 7/1976 | Jensen | 65/1 |
| 4,024,336 | 5/1977 | Jensen | 13/6 |
| 4,063,027 | 12/1977 | Varrasso et al. | 13/6 |
| 4,107,446 | 8/1978 | Pieper | 13/6 |
| 4,149,022 | 4/1979 | Hrycik | 13/6 |
| 4,162,379 | 7/1979 | Sebens et al. | 219/497 |
| 4,167,403 | 9/1979 | Coggin | 65/1 |
| 4,285,712 | 8/1981 | Thompson | 65/2 |
| 4,343,637 | 8/1982 | Shofner et al. | 65/2 |
| 4,418,339 | 11/1983 | Spofford, Jr. et al. | 340/595 |
| 4,511,791 | 4/1985 | Desai et al. | 65/162 |
| 4,511,792 | 4/1985 | Kawamura | 219/499 |
| 4,515,614 | 5/1985 | Barkhau et al. | 65/162 |
| 4,546,485 | 10/1985 | Griffiths et al. | 373/28 |
| 4,594,087 | 6/1986 | Kuhn | 65/1 |
| 4,657,572 | 4/1987 | Desai et al. | 65/1 |
| 4,738,700 | 4/1988 | Grundy | 65/2 |
| 4,780,120 | 10/1988 | Varrasso et al. | 65/1 |
| 4,787,926 | 11/1988 | Varrasso | 65/10.1 |

Primary Examiner—Kenneth M. Schor
Assistant Examiner—John A. Hoffmann
Attorney, Agent, or Firm—Andrew C. Siminerio

[57] ABSTRACT

A bushing balance controller controls the overall average temperature of a multiple segment glass fiber forming bushing and the temperature of each individual bushing segment. Current shunting loops divert current away from each bushing segment as required to provide the proper bushing segment temperature profile as well as the desired average bushing temperature.

11 Claims, 3 Drawing Sheets

BUSHING BALANCE CONTROLLER FOR MULTIPLE SEGMENT BUSHINGS

A portion of the disclosure of this patent application contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

This invention relates to an apparatus for producing strands of fiber glass from different sections of a fiber glass bushing and, more particularly, to actively monitoring thermocouples positioned at each bushing segment and controlling the temperature of each individual bushing segment.

2A. Technical Considerations

Glass fibers are produced by drawing multiple streams of molten glass at a given rate of speed through orifices or nozzles located in a heated container, known in the fiber glass industry as a bushing. The bushings containing the molten glass are electrically heated and maintained at given temperatures to provide molten glass at the orifices or nozzles at a desired viscosity. The fibers drawn from the orifices or nozzles are gathered after they solidify into one or more strands and are collected on a collet into one or more forming packages.

In recent years, bushings have increased in size so that bushings having 800 to 2,000 or more orifices or nozzles are commonplace in the industry. It is also common practice to produce more than one strand from these larger bushings by winding, for example, four strands from a single bushing. Such an arrangement is generally referred to as a split-bushing. Typically, this is accomplished by dividing the bushing into sections with each section providing one strand. Splitting the bushing in this manner to produce more than one strand requires precise control of the bushing section temperatures so that the strands produced and collected on the collet have the same yardage, i.e., the same yards per pound of glass or, viewed in another way, the same weight of glass strand per package collected on the collet for a given period of time.

The development of technology for adjustment of bushing heat patterns and control of individual strands has progressed from moving manual fin coolers, which provide large but somewhat imprecise bushing adjustments, to three and four terminal controllers which adjust the electrical current in each section of the bushing by shunting a controlled current around sections of the bushing to produce variable heating. However, generally with these types of controllers, there is no feedback of external process conditions, such as overall bushing temperature. Thus, a long term glass flow adjustment could be performed but short term temperature variances persist. In addition, when a temperature sensor used to measure the bushing segment for these types of controllers fails, it is common practice to disconnect the failed temperature sensor and continue to operate the controller using the average temperature of the remaining temperature sensors.

It is an object of the present invention to provide a bushing balance controller that actively monitors and controls the temperature of each bushing by monitoring the status of temperature sensors in the bushing as well as the overall thermal condition of the bushing and to provide alternative modes of control based on the status of temperature sensors at the bushing.

2B. Patents of Interest

U.S. Pat. No. 3,246,124 to Trethewey teaches a temperature control device for a glass fiber forming bushing wherein the power to the bushing is based on the average temperature of the bushing.

U.S. Pat. No. 3,540,001 to Gormley et al. teaches a control circuit having at least two controllers which are operatively connected to provide interrelated operation. For example, a first controller can operate on a first process variable to provide a remote set point for a second controller. The second controller, in turn, operates to control a second process variable which directly affects the first variable.

U.S. Pat. No. 4,024,336 to Jensen teaches a circuit for controlling the temperature of a two-segment fiber glass forming bushing. The bushing control uses two temperature controllers and two full wave variable impedance devices to regulate the current transmitted from a power transformer to the two segments of the bushing.

U.S. Pat. No. 4,149,022 to Hrycik teaches a power control system for electrically melting glass in a vertically oriented type glass melting furnace. Multiple sets of electrodes are positioned at various levels within the furnace and a control means directs power to the electrodes, as necessary, to distribute electrical energy in the furnace.

U.S. Pat. No. 4,546,485 to Griffiths et al. teaches a method of equalizing the temperature of a fiber glass forming bushing by averaging the temperature across the bushing face plate and controlling the power input to the bushing in response to the measured average. The two halves of the bushing are controlled by placing a variable resistor in the power supply lines to the bushing and adjusting current input to the side in response to variations in weight or yardage measured for the two strands produced by the bushing.

U.S. Pat. No. 4,594,087 to Kuhn teaches a three terminal controller for a fiber glass bushing. The bushing temperature is measured by a plurality of thermocouples which produce an average temperature reading that is used to control the power fed to the bushing. The three terminal controller is connected across two sections of the bushing to regulate relative current flow in the two sections in order to control the amount of fiber produced in each section.

U.S. Pat. No. 4,657,572 to Desai et al. teaches a bushing balance controller which measures voltage drop across each segment of a multiple segment glass fiber forming bushing and the current flow in the bushing. These measurements produce error signals proportionate to the difference in the set point temperature and the instantaneous temperature of each segment of the bushing. Current is diverted from each segment of the bushing who error signal is greater than the average error signal and current is supplied to the overall bushing when the sum of the error signals is greater than a preset value.

U.S. Pat. No. 4,738,700 to Grundy teaches the positioning of thermocouples in a fiber glass forming bushing at locations that eliminate or reduce electrical signal noise. A controller averages the monitored temperatures of the thermocouples which, in turn, is used to regulate the current passing through the bushing.

U.S. Pat. No. 4,780,120 to Varrasso et al. teaches a balanced bushing controller for a multiple section glass fiber producing bushing. Thermocouples connected to all but one of the bushing sections control the application of power of those sections. A thermocouple connected to the last bushing segment controls the application of electrical energy to the entire bushing.

U.S. Pat. No. 4,787,926 to Varrasso teaches a digitally controlled apparatus for varying the temperature of a glass fiber forming bushing over a period of time. The digitally controlled apparatus is used in combination with a constant speed winder so as to adjust the temperature of the bushing to maintain a constant glass fiber diameter as the fiber is wound on the winder.

SUMMARY OF THE INVENTION

The present invention provides a method of controlling the temperature of a multiple segment fiber glass forming bushing. The overall bushing temperature as well as the individual bushing segment temperatures are monitored and adjusted to provide the required temperature profile of the bushing. In particular, electrical current to the bushing is controlled to maintain the bushing at a predetermined average temperature while bushing segment control loops shunt current around each segment to control the temperature of the individual segment. The present invention controls the individual segment temperatures by monitoring either the temperature of the segments or the current flow through the segments. In one particular embodiment of the invention, the bushing temperature is initially controlled by monitoring the signals from thermocouples at each bushing segment control circuits. The controls automatically switch to current monitoring controls when a temperature sensor in the temperature monitoring circuit malfunctions.

DETAILED DESCRIPTION OF THE INVENTION

Figure 1:
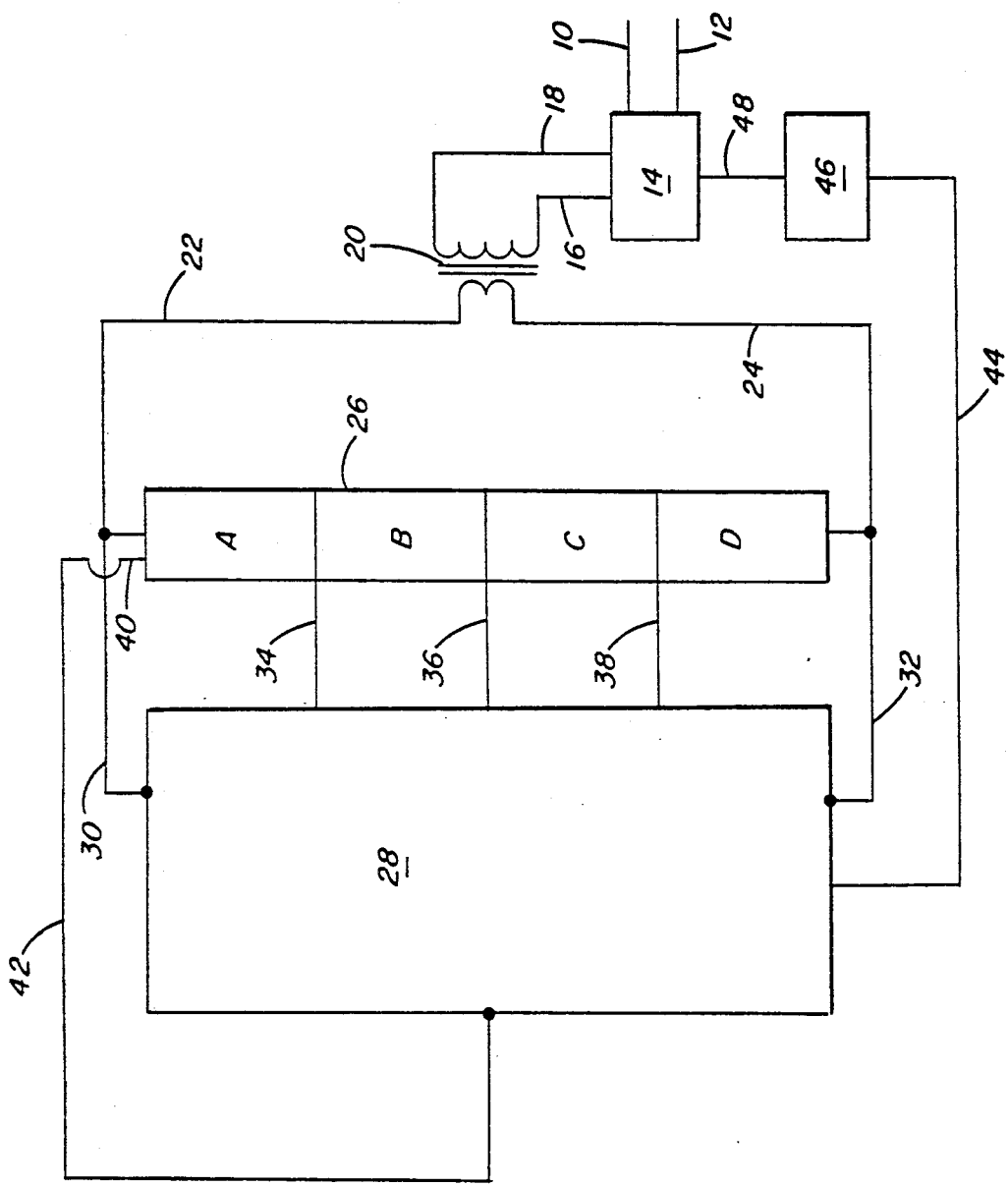
FIG. 1 is a block diagram of a multiple segment fiber glass forming bushing and a bushing balance controller.

Referring to FIG. 1, there is shown input lines 10 and 12 feeding into a power pack 14. Electrical leads 16 and 18 from power pack 14 feed current into the primary coil of a power transformer 20. Secondary coil of the transformer 20 is connected across electrical lines 22 and 24. Also connected across lines 22 and 24 and parallel to transformer 20 is bushing 26. Although not limiting in the present invention in the particular embodiment shown in FIG. 1, bushing 26 is divided into four sections—A, B, C, and D. Bushing balance controller 28, which is the object of this invention, is connected across lines 22 and 24 and parallel to the transformer 20 via lines 30 and 32. In addition, each individual bushing segment is connected to the bushing balance controller 28 via lines 34, 36, and 38. These lines shunt current through shunting circuits in the bushing balance controller 28 to control the amount of current passing from the transformer 20 through each individual segment, as will be discussed later in more detail, and provide the proper temperature in each bushing segment. Temperature sensors 40 feed signals from each bushing segment via lines 42 to the bushing balance controller 28 in response to the temperature of each bushing segment. Line 44 leaves the bushing balance controller 28 and feeds primary controller 46 which, in turn, is connected through line 48 to the power pack 14, to control the overall current provided to the bushing 26 through lines 22 and 24, as will be discussed later in more detail.

Figure 2:
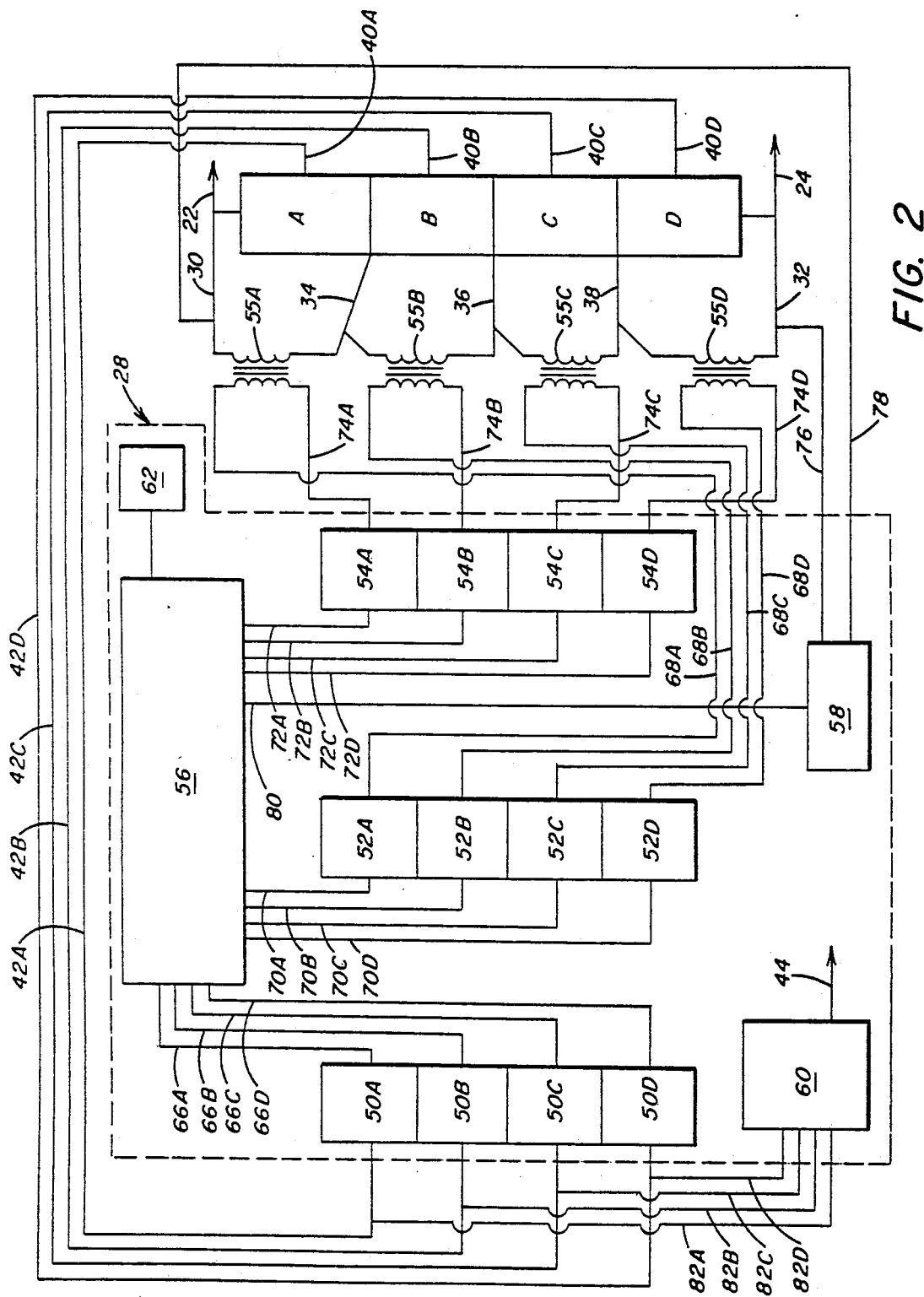
FIG. 2 is a block diagram of the bushing balance controller shown in FIG. 1.

The bushing balance controller 28 controls the temperature of each individual segment of the bushing 26 by controlling both the overall current provided to the bushing 26 by transformer 20 and individually controlling the amount of current shunted from the bushing segment, based on the desired segment temperature. Referring to FIG. 2, the block diagram shows four bushing segment control loops, each of which controls the temperature of one bushing segment by controlling the amount of current passing through the segment. In FIG. 2, each component of the control loops is followed by the letter A, B, C, or D to indicate which control loop corresponds to a particular bushing segment. Unless stated otherwise, each corresponding component is identical for each control loop. Each control loop includes a temperature measurement circuit 50 for temperature control, current measurement circuit 52 for current control, and a phase controlled thyristor variable impedance circuit 54 for control of bushing shunt current through transformers 55 in each control loop. Also included in the controller 28 is a data acquisition system and computer controller 56 to store data and control the overall functioning of the controller 28, a thyristor firing synchronization circuit 58 to synchronize the firing of thyristors in variable impedance circuit 54 with the bushing voltage, a temperature averaging circuit 60 to determine the average temperature of the bushing 26, and a communications interface 62 to allow direct user interface with the controller 28. The controller 28 also includes means to automatically switch from a temperature control mode of controlling the temperature of the bushing segments to a current control mode, in the event that one or more of the temperature sensors 40 becomes inoperative.

The controller 28 sequentially reads and records temperatures and currents of each bushing segment, calculates control variables, and controls the firing of the thyristors in the impedance circuit 54 to control the current supplied to each bushing segment. Although not limiting in the present invention, in the preferred embodiment, the operating sequence is repeated each half cycle of the bushing voltage wave form, i.e., every 8.33 milliseconds. More particularly, the temperature sensors 40 are connected to each bushing segment and their signals are feed through lines 42 to temperature measurement circuits 50. The signal is then fed to the system controller 56 via lines 66. In addition, the individual transformers 55 are connected to the current circuits 52 through lines 68 which in turn measure the current flow therethrough and sends the signal via lines 70 to the system controller 56. The system controller 56 initiates a read sequence wherein it reads and stores input data from circuits 50 and 52. This information is used by the system controller 56 to calculate control variables and determine the amount of current that should be shunted from each bushing segment through control circuits 54 to control each bushing segment temperature. The control signals are fed through lines 72 from the system controller 56 to the control circuits 54 which in turn are connected via lines 74 to transformers 55. The synchronization circuit 58 is connected in parallel through lines 76 and 78 with transformers 55 to monitor the voltage drop across the bushing 26 and feed this information through line 80 to the system controller 56 to control the firing sequence of the thyristors in the impedance circuits 54. After this control sequence is completed, the system controller 56 returns to the read sequence and initiates the next control cycle based on the new bushing temperature conditions.

In addition, the temperature sensors 40 also feed information to temperature averaging circuit 60 via lines 82 which determines the average overall temperature of the bushing 26, as will be discussed later.

The control sequence uses the temperature and current data from the read sequence to determine the number of active bushing segments in the bushing 26 and calculate control and output variables for each of the active bushing segment control loops. If all active segments give good temperature readings, then temperature control is selected for the bushing control. If any sensor gives a temperature reading outside of a predetermined temperature range, then current control is selected for bushing control.

With temperature control, control is implemented to maintain specified differences between temperatures at each sensor. This is achieved by maintaining the average bushing temperature at a desired value and controlling the temperature set points, i.e., the difference between each segment temperature and the average bushing temperature. In order to maintain stable control, the individual set points must sum to zero and are adjusted, as a whole, so that this condition is met.

With current control, control is implemented to maintain the current set point values for each bushing segment. This is achieved by maintaining the average bushing temperature at a desired value and controlling the current set points, i.e., the current to be directed through a bushing segment control loop. The individual current set points are adjusted as a whole so that no segment has negative current set point and preferably at least one segment has a zero current set point. This maintains stability between the interacting segments.

In either control mode, the total number of bushing segment control loops shunting the full bushing current is limited to one less than the total number of active control loops. This prevents the possibility of a short circuit across the bushing which would result if all control loops shunted current simultaneously.

Although not limiting in the present invention, the following is a more detailed description of one particular embodiment of the major components of the controller 28. However it should be appreciated that other circuits and/or equipment may be used to provide the control to the bushing 26 as taught in this disclosure.

Temperature Measurement Circuit 50

Referring to FIG. 2, the temperature measurement for each bushing segment is performed by an Analog Devices 2B50A isolated, thermocouple signal conditioner. The temperature input range was selected at 32° to 2500° F. (0° to 1371° C.). This corresponds to an input signal level of 0 to 15.627 millivolts and an output range of 0 to 10 volts. The input sensitivity at 2200° F. (1204° C.) is 7.73 microvolts/°F. (4.29 microvolts/°C.) at a level of 13.286 millivolts. The output sensitivity equals the input sensitivity times the voltage gain which is 4.95 millivolts/°F. (2.75 millivolts/°C.).

Current Measurement Circuit 52

Figure 3:
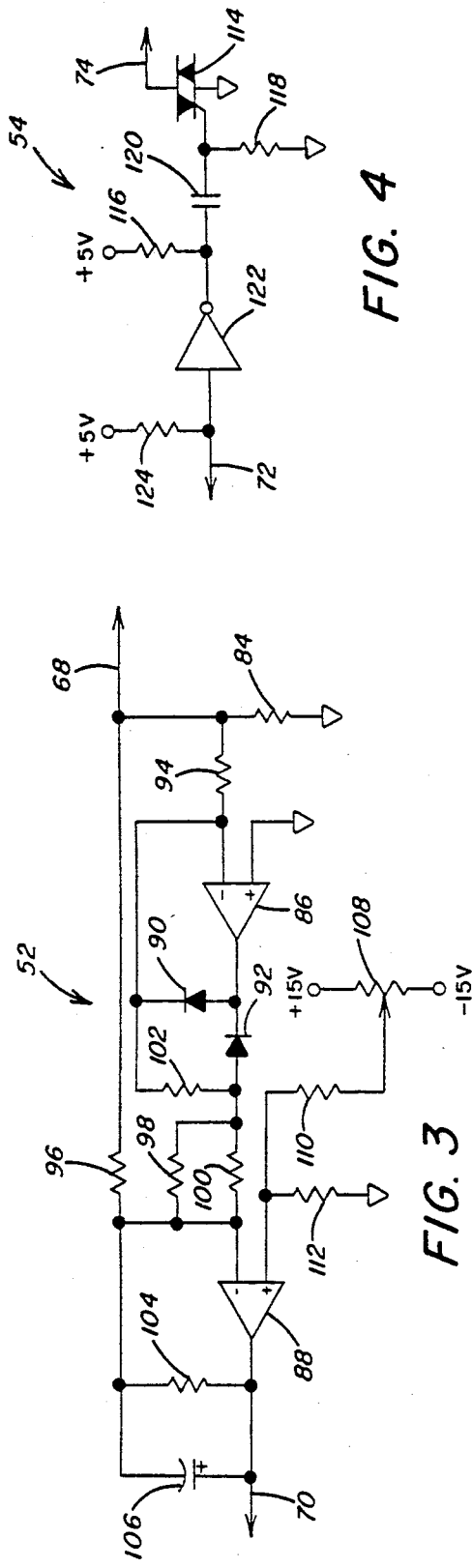
FIG. 3 is a line diagram of one embodiment of the current control circuit of the bushing balance controller shown in FIG. 2

Referring to FIGS. 2 and 3, the current is measured as the voltage drop across a 0.1 ohm resistor 84. The AC current at the bushing can exceed 150 amperes RMS with maximum thyristor conduction. With a 50:1 transformer turns ratio, up to three amperes RMS may be conducted in the current measuring resistor. Typically the maximum current will not exceed two amperes RMS which would produce a power dissipation of 0.4 watts. The current for each segment control loop is measured at resistor 84 by Motorola LM324 Series quad differential input operational amplifiers 86 and 88 and associated circuitry. The AC waveform is processed using a full wave precision rectifier circuit consisting of operational amplifiers 86 and 88, diodes 90 and 92, five matched 22K±2% resistors 94, 96, 98, 100, and 102, and a 1M±1% resistor 104. There is no gain calibration adjustment. To filter the rectified voltage, 1 μF capacitor 106 is connected in parallel with feedback resistor 104 to achieve a one second low pass filter response. To provide offset nulling, a ±30 millivolt adjustment is provided at the noninverting input of amplifier 88 using a voltage divider network consisting of a 25 turn cermet trimming potentiometer 108, a 100K resistor 110, and a 200 ohm resistor 112.

Phase Controlled Variable Impedance Circuit 54

Figure 4:
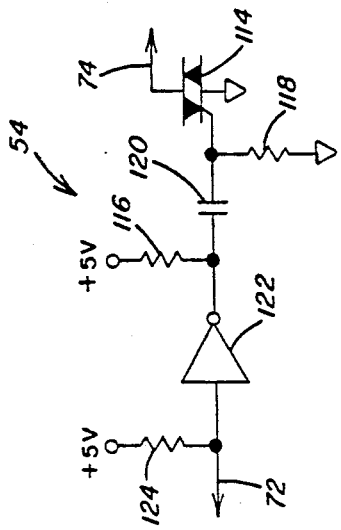
FIG. 4 is a line diagram of one embodiment of the impedance control circuit of the bushing balance controller shown in FIG. 2

The variable impedance function to shunt current from a bushing segment is achieved with a phase controlled thyristor circuit. For each bushing segment control loop, the bushing shunt current of up to 100 amperes is conducted through the primary winding of transformers 55 as shown on FIG. 2. With a turns ratio of 50:1 the secondary winding current of up to 2 amperes passes through a triac and a 0.1 ohm current sensing resistor connected in series. The ground connection is made at the junction of the triac and resistor to the analog ground plane. Referring to FIG. 4, the phase controlled element 114 is a General Electric Power Pac ™ SC146M triac. The circuit 54 includes 100 ohm resistor 116, 10 ohm resistor 118, 0.1 μF capacitor 120, and Motorola ULN2003A Darlington transistor array 122. 4.7K pull-up resistor 124 is necessary to supply current to the Darlington array 122 which requires 150 microamperes at 2 volts to fully turn on. The Darlington transistor array 122 has an open collector output and requires resistor 116 as a pull-up resistor to recharge capacitor 120 after discharge during triggering. Resistor 118 pulls the gate of triac 114 to ground except during a trigger pulse. The output of the system controller 56 (shown in FIG. 2) is normally held low. When triggering the triac 114, the output rises to approximately 3 volts for 13 microseconds. Capacitor 120 is then discharged through the array 122 and the gate of triac 114. After triggering, capacitor 120 recharges through resistors 116 and 118. The +5 volt power return for array 122 is to the digital ground while resistor 118 and triac 114 are connected to the analog ground since the triac current also flows through resistor 84 in the current measurement circuit.

Data Acquisition System and Computer Control 56

The temperatures and currents for each of the four bushing control segments are read with a Micro Networks MN7145K Series 8-channel, 12-bit data acquisition system. The output is connected to an Intel MCS®-51 model 8751H 8-bit control-oriented microcontroller.

Synchronization Circuit 58

Synchronization with the voltage across the transformers 55 is required for phase control of the triacs 114 in the variable impedance circuits 54. The time reference for triac firing is the point in each half cycle of the 60 Hz power frequency when the bushing power pack 14 is triggered. Just prior to this time, there is zero voltage across the transformers 55 and the triacs 114 could not be triggered. Triggering at the reference time will result in maximum conduction angle and maximum shunt current in the bushing circuit. Current will decrease with increasing delay of triggering after the reference point.

Figure 5:
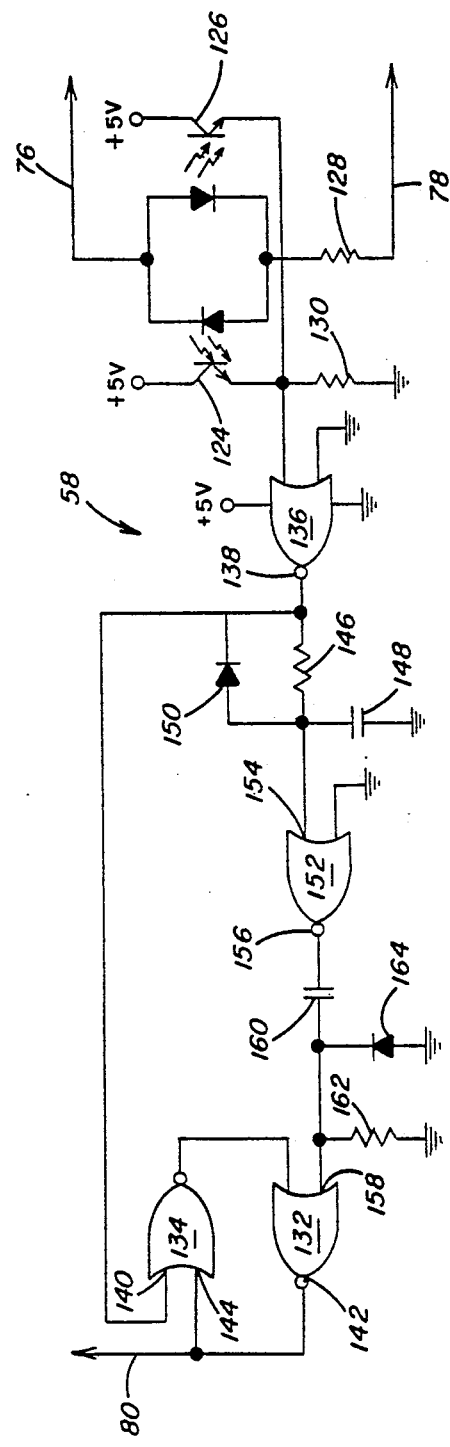
FIG. 5 is a line diagram of one embodiment of the current synchronization circuit of the bushing balance controller shown in FIG. 2

Referring to FIGS. 2 and 5, the voltage across the transformers 55, i.e. the bus bar voltage, is monitored by two General Electric 4N27 photon coupled isolators 124 and 126, in which the light emitting diodes are connected anti-parallel and in series with 68 ohm current limiting resistor 128. With a maximum specified LED current of 100 ma at a forward conduction voltage of 1.38 volts, the peak bus bar voltage preferably should not be allowed to exceed 8.18 volts. The phototransistors in the isolators are connected in parallel and in series with 10K resistor 130. The voltage at 130 is normally at logic high except when the bus bar voltage is below the forward conduction voltage of the LEDs. This occurs twice during each half cycle, when the power pack is off and at the zero crossing of the bus bar voltage just prior to commutation of the power pack. Since the bushing power packs are normally operated with a conduction angle greater than ninety degrees, the signal at resistor 130 consists of two negative pulses each half cycle in which the longer period between pulses corresponds to the allowed triggering period of the triacs.

The rest of the synchronization circuit 58 converts each pair of negative pulses to a single positive pulse which spans both input pulses and the shorter period between them. This is achieved with an RS flip-flop comprised of NOR gates 132 and 134 which are two of the four gates in a Motorola MC14001UB quad 2-input NOR gate. The negative pulses are first inverted by NOR gate 136 into a pair of positive pulses at pins 138 and 140. The leading edge of the first pulse sets the flip-flop output high at pins 142 and 144. The flip-flop must be reset at the trailing edge of the second pulse. To distinguish between the pulses, a time delay circuit is used consisting of 180K resistor 146, 0.01 μF capacitor 148, diode 150, and NOR gate 152. Since the first of the two pulses occurs at a zero crossing while the second occurs during the power pack off time, the first pulse is normally of shorter duration than the second. The resistor and capacitor time constant is selected so that the capacitor voltage at pin 154 will not rise to the gate threshold level during the shorter first pulse but will during the longer second pulse. The gate output signal at pin 156 will consist of a single negative pulse whose trailing edge corresponds to the trailing edge of the second input pulse. This negative pulse is coupled to the reset input of the RS flip-flop at pin 158 by 100 pF capacitor 160. 100K resistor 162 references the gate input to ground while diode 164 prevents the gate input from exceeding −0.7 volts. The signal at pin 158 is a positive pulse of very short duration which coincides with the trailing edge of the second input pulse. All power returns in the synchronization circuit 58 are to the digital ground. The synchronization circuit output at pins 142 and 144 is connected to an interrupt input of the 8751H microcontroller in the system controller 56 via line 80.

Communications Interface 62

Referring to FIG. 2, a four wire RS-422-A communications protocol was selected to provide for manual interfacing with the system controller 56. The 8751H microcontroller is provided with an integral UART which interfaces with the RS-422-A through Fairchild Semiconductor μA96176 differential bus transceivers.

The following describes the operating sequence used to control the bushing segment temperatures in more detail.

Copyright 1990 PPG Industries, Inc.

1. Calculate number of active segments—Starting with segment 1, count up to the first shorted thermocouple or segment N (assuming the bushing has N segments), whichever comes first. A nonshorted thermocouple is one whose reading is greater than a predetermined value. In the preferred embodiment of the invention, this value is set at 287° F. If the number of active segments is less than 2, no control is performed.

2. Select current or temperature control—If the thermocouple temperature measurement for any active segment falls outside a predetermined operating range, switch to current control and go to step 3; otherwise, go to step 9 for temperature control. Although not limiting in the present invention, the preferred embodiment of the invention uses a temperature range of 1996° F. to 2375° F.

3. Calculate average bushing temperature—Sum all measured temperatures from the active segments that are within the predetermined operating range and divide by the number of summed temperatures.

4. Adjust bushing current for average temperature—If the measured average temperature is less than the desired average bushing temperature, increase total current to the entire bushing to uniformly increase the temperature of all bushing segments. If the measured average temperature is greater than the desired average bushing temperature, decrease total current to the bushing.

5. Initialize current set points—Set a current set point for each active segment to zero. This step is performed only once after the controller is first activated and the bushing has stabilized.

6. Normalize current set points—If any current set point for an active segment is less than zero, then increment all current set points by one predetermined unit. If all current set points are greater than zero, then decrement all current set points by one unit. After several passes through the normalization sequence (which will occur once every 8.33 milliseconds), the desired condition of no negative current set points and at least one zero current set point will be achieved.

7. Calculate current control error—For each active segment, calculate the current control error as the actual current through the bushing segment control loop less the current set point.

8. Current control—Divert more current through the bushing segment control loop for each segment of the bushing whose current error signal is less than zero and divert less current through the bushing segment control loop for each segment whose current error signal is greater than zero. Restrict triac firing to one less than the number of active control loops to prevent a short circuit across the bushing. Then go to step 15.

9. Calculate average bushing temperature—Sum all the measured temperatures from the active segments and divide by the number of active segments.

10. Adjust bushing current for average temperature—If the measured average temperature is less than the desired average bushing temperature, increase the total current to the entire bushing to uniformly increase the temperature of all bushing segments. If the measured average temperature is greater than the desired average bushing temperature, decrease the total current to the bushing.

11. Initialize temperature set points—For each active segment, calculate the temperature set point as the actual segment temperature minus the average bushing temperature. This step is performed only once, after the controller is activated and the bushing has stabilized.

12. Normalize temperature set points—Sum temperature set points for all active segments. If the sum is less than zero, then increment all set points by one predetermined unit. If the sum is greater than zero, then decrement all set points by one predetermined unit. After several passes through the normalization sequence, the desired condition of set points summing to zero will be approached. It should be noted that since a condition can exist in which incrementing or decrementing all set points by one unit may not result in a zero sum, the set points can alternate between two values one unit apart every 8.33 milliseconds. This is much faster than the bushing response time and allows stable control of temperature.

13. Calculate temperature control error—For each active segment, calculate the temperature control error as the actual measured temperature less the set point temperature less the actual average bushing temperature.

14. Temperature control—Divert more current through the bushing segment control loop for each segment of the bushing whose temperature error signal is greater than zero and divert less current through the bushing segment control loop for each segment of the bushing whose error temperature signal is less than zero. Restrict triac firing to one less than the number of active channels to prevent a short circuit across the bushing bus bars.

15. Repeat control sequence—The control sequence is repeated and bushing control is updated using revised input data based on prior control cycle.

One skilled in the art could write a computer program to carry out the operating sequence as disclosed above.

The following are examples of the operating sequence taught in the present invention to control the temperature in each segment of the bushing. These examples are for illustration only to show the operating sequence in controlling bushing temperature and do not represent actual control data. The first example illustrates the temperature control sequence and the second example illustrates the current control sequence. For the sake of this illustration, it will be presumed that the bushing is divided into four segments, A, B, C, and D.

EXAMPLE 1

For this example, assume that the bushing has the following temperature parameters:

| Segment Temperature, T | Temperature Set Point, TSP |
| --- | --- |
| $T_A = 2000°$ F. | $TSP_A = -50°$ F. |
| $T_B = 2040°$ F. | $TSP_B = -10°$ F. |
| $T_C = 2070°$ F. | $TSP_C = +20°$ F. |
| $T_D = 2090°$ F. | $TSP_D = +40°$ F. |

The average temperature, $T_{ave}$, for this temperature profile equals 2050° F.

Assume that the operator wants to increase the temperature for segment B by 40° F. to 2080° F. To achieve this change, the operator would change $TSP_B$ by 40° F. from $-10°$ F. to $+30°$ F. and desired $T_{ave}$ from 2050° F. to 2060° F.

Cycle 1—After the changes are made and the bushing balance controller has determined the number of active segments and has chosen temperature control (steps 1 and 2), the bushing balance controller will first calculate the actual average temperature (step 9) of the bushing which will be (2000° F. + 2040° F. + 2070° F. + 2090° F.)/4 = 2050° F. which is less than the desired $T_{ave}$ of 2060° F. As a result, the controller will signal the primary controller to increase the current to the entire bushing (step 10). As the current increases, each of the segment temperatures will increase by equal amount, e.g., by 5° F. to 2005° F., 2045° F., 2075° F. and 2095° F., respectively, prior to the next cycle of the control sequence, and the actual average of the temperatures will be 2055° F. The next step is to normalize the temperature set points (step 12). The sum of the temperature set points is $+40$ (i.e. $-50+30+20+40$). Since the sum is greater than 0, each of the temperature set points is reduced by one unit, e.g., 5° F. to $TSP_A = -55°$ F., $TSP_B = +25°$ F., $TSP_C = +15°$ F., and $TSP_D = +35°$ F. The next control operation is to modify the amount of bushing current shunted around each individual segment by each bushing segment control loop to account for the change in the set point temperature (steps 13 and 14). This is done by first calculating a temperature control error for each segment, which is equal to the actual measured temperature of the segment less the temperature set point less the actual average temperature of the bushing. The temperature control error for each segment during this cycle is:

A: $2005 - (-55) - 2055 = +5$
B: $2045 - 25 - 2055 = -35$
C: $2075 - 15 - 2055 = +5$
D: $2095 - 35 - 2055 = +5$

Based on the control errors, more current would be diverted through the bushing segment control loops of segments A, C, and D, and less through the control loop for segment B. However, the time it takes for the bushing to change overall temperature in response to change in the bushing current directed by the primary controller is much faster than the response time of each individual segment to the individual bushing segment control loops. As a result, although steps 13 and 14 of this first cycle of the control sequence would indicate non-zero temperature control error so that adjustment to the firing of the individual triacs would be changed to control temperature in each bushing segment, the response time would be sufficiently slow as compared to the bushing's response to the primary controller that the next control cycle would already be initiated, which would further modify the individual segment control. Because of this difference in response time, it can be presumed that as the control sequence successively cycles, steps 9, 10 and 12 will dominate the initial control of the bushing and drive the temperature profile to 2010° F., 2050° F., 2080° F., and 2100° F., i.e. increase the temperature of each segment by 10° F. so that the actual $T_{ave}=2060°$ F. (as discussed below in Cycle 2), before any temperature effect due to changes in the bushing segment control loop are observed.

Cycle 2—As the next cycle of the operating sequence begins, the bushing temperature parameters are:

| | |
|---|---|
| $T_A$ = 2005° F. | $TSP_A$ = −55° F. |
| $T_B$ = 2045° F. | $TSP_B$ = +25° F. |
| $T_C$ = 2075° F. | $TSP_C$ = +15° F. |
| $T_D$ = 2095° F. | $TSP_D$ = +35° F. |
| actual $T_{ave}$ = 2055° F. | |

Since the actual $T_{ave}$ is still less than the desired $T_{ave}$ of 2060° F., the primary controller will continue to provide additional current to the bushing to increase the segment temperatures to 2010° F., 2050° F., 2080° F., and 2100° F., respectively. The sum of the temperature set points is $(-55)+25+15+35=+20$. Therefore, the normalization step will further reduce all the temperature set points by, e.g., 5° F. to −60° F., +20° F., +10° F., and +30° F. The control sequence will again perform the temperature control error operations, but as discussed earlier, the effect of the modification in the segment control loops at this point in time will be minimal.

Cycle 3—As the cycle begins, the bushing parameters are:

| | |
|---|---|
| $T_A$ = 2010° F. | $TSP_A$ = −60° F. |
| $T_B$ = 2050° F. | $TSP_B$ = +20° F. |
| $T_C$ = 2080° F. | $TSP_C$ = +10° F. |
| $T_D$ = 2100° F. | $TSP_D$ = +30° F. |
| actual $T_{ave}$ = 2060° F. | |

The actual average temperature now equals the desired average bushing temperature of 2060° F., so at this time, no additional bushing current increase is required. In addition, the sum of the temperature set points equals 0, therefore, normalization of the temperature set point is complete. These temperature set point values represent the temperature set points required for each bushing segment of a bushing having an average temperature of 2060° F. and a segment temperature profile of 2000° F., 2080° F., 2070° F., and 2090° F. Now that the primary controller has established the required average bushing temperature, the change in current diverted by the individual bushing segment current loops will now influence the individual segment temperatures. The temperature control errors for each segment during this cycle are:

A: 2010−(−60)−2060= +10
B: 2050−20−2060= −30
C: 2080−10−2060= +10
D: 2100−30−2060= +10

Since the controller will divert more current from each segment whose control errors greater than zero, so as to reduce the bushing segment temperature, and divert less current from each segment of the bushing whose error control is less than zero, so as to increase the segment temperature, based on these control errors, additional current will be diverted from segments A, C, and D to reduce the segment temperature and less current will be diverted from segment B to increase its temperature.

Subsequent cycles—It is apparent from the preceding example that as the individual section temperature changes, the primary controller will continue to adjust bushing current to maintain the average bushing temperature at the desired value. In addition, the temperature control error sequence will continue to adjust the amount of current diverted by each individual bushing segment control loop. As a result, this interactive process will continue to drive the control of the bushing to a condition such that:
 1) the actual average temperature equals the desired average temperature,
 2) sum of the temperature set points equals 0, and
 3) each temperature control error equals 0.

EXAMPLE 2

The following example is provided to illustrate the current control mode of the present invention. This mode operation will automatically be initiated to control the bushing when a failed thermocouple is detected (step 2). For the sake of the illustration, it will again be presumed that the bushing has four segments with the following temperature profile and current set points:

| Segment Temperature, T | Current Set Point, CSP |
|---|---|
| $T_A$ = 2000° F. | $CSP_A$ = 9 |
| $T_B$ = 2040° F. | $CSP_B$ = 5 |
| $T_C$ = 2070° F. | $CSP_C$ = 2 |
| $T_D$ = 2090° F. | $CSP_D$ = 0 |

The average temperature, $T_{ave}$, for this temperature profile equals 2050° F.

Assume that the operator wants to increase the temperature of segment B to 2120° F. which will require a reduction in the current set point of 7. To affect the changes, the operator inputs a desired $T_{ave}$ of 2070° F. and a new current set point for segment B, $CSP_B$, of $5+(-7)=-2$. In addition, for the sake of illustration it will be presumed in this example that all four of the temperature sensors are functioning properly.

Cycle 1—Initially, the controller determines the actual average temperature of the bushing which is (2000° F.+2040° F.+2070° F.+2090° F.)/4=2050° F. (step 3) and compares it to the desired $T_{ave}$ of 2060° F. (step 4). Since the actual $T_{ave}$ is less than the desired $T_{ave}$, the bushing balance controller will signal the primary controller to increase the current to the bushing to uniformly increase the temperature to the overall bushing by e.g., 10° F. to 2010° F., 2050° F., 2080° F. and 2100° F. The bushing balance controller will initiate normalization of the current set points (step 6) by increasing all the current set points by one unit if any of the set points are less than zero and decreasing all the set points by a unit if all the set points are greater than zero. In this example, the new current set points after the input adjustment by the operator are $CS_A=+9$, $CS_B=-2$, $CS_C=+2$, and $CS_D=0$. Since $CS_B$ is less than 0, the controller will increase all the set points by one unit to +10, −1, +3, and +1, respectively.

The next control operation is to modify the amount of bushing current shunted around each individual bushing segment by each bushing segment control loop to account for the change on the bushing current (steps 7 and 8). This is done by first calculating the current control error for each active segment which is the actual current through the control loop less the current set point. The current control error for each segment during this cycle is:

A: 9−10=−1
B: 5−(−1)=+6
C: 2−3=−1
D: 0−1=−1

Based on these control errors, more current would be diverted through the bushing segment control loop of segments A, C, and D, and less through the control loop for segment B. However, as discussed earlier, the time it takes for the bushing to change overall temperature in response to change in the bushing current directed by the primary controller is much faster than the response time of each individual segment to the individual bushing segment control loops. As a result, although steps 7 and 8 of this first cycle of the control sequence would indicate non-zero temperature control error so that adjustment to the firing of the individual triacs would be changed to control temperature in each bushing segment, the response time would be slow enough that the next control cycle would already be initiated, which would further modify the individual segment control. Because of this difference in response time, it can be presumed that as the control sequence successively cycles, steps 3, 4, and 6 will dominate the initial control of the bushing and drive the temperature profile to 2020° F., 2060° F., 2090° F., and 2110° F., i.e., increase the temperature of each segment by 20° F. so that the actual $T_{ave}=2070°$ F. (as discussed below in Cycle 2) before any temperature effect due to change in the bushing segment control loop are observed.

Cycle 2—As the next cycle of the operating sequence begins, the bushing temperature parameters are:

| | |
|---|---|
| $T_A$ = 2010° F. | $CSP_A$ = +10 |
| $T_B$ = 2050° F. | $CSP_B$ = −1 |
| $T_C$ = 2080° F. | $CSP_C$ = +3 |
| $T_D$ = 2100° F. | $CSP_D$ = +1 |
| actual $T_{ave}$ = 2060° F. | |

Since the actual $T_{ave}$ is still less than the desired $T_{ave}$ of 2070° F., the primary controller will continue to provide additional current to the bushing to increase the segment temperature to 2020° F., 2060° F., 2090° F., and 2110° F., respectively. Since $CSP_B$ is still less than 0, the normalization step will further increase all the set points by one unit to +11, 0, +4, and +2. The control sequence will again perform the current control error operations, but as discussed earlier, the effect of the modification in the segment control loops at this point in time will be minimal.

Cycle 3—As this cycle begins, the bushing parameters are:

| | |
|---|---|
| $T_A$ = 2020° F. | $CSP_A$ = +11 |
| $T_B$ = 2060° F. | $CSP_B$ = 0 |
| $T_C$ = 2090° F. | $CSP_C$ = +4 |
| $T_D$ = 2110° F. | $CSP_D$ = +2 |
| actual $T_{ave}$ = 2070° F. | |

The actual average temperature now equals the desired average bushing temperature of 2070° F. so at this time, no additional bushing current increase is required. In addition, no current set point is less than 0 and $CSP_B=0$, therefore, normalization of the current set point is complete. These current set point values represent the current set points required for each bushing segment of a bushing having an average temperature of 2070° F. and a segment temperature profile of 2000° F., 2120° F., 2070° F., and 2090° F. Now that the primary controller has established the required average bushing temperature, the change in current diverted by the individual bushing segment current loops will now influence the individual segment temperature.

The current control errors for each segment during this cycle are:
A: 9−11=−2
B: 5−0=+5
C: 2−4=−2
D: 0−2=−2

Based on these current control errors, additional current will be diverted to the bushing segment control loop for segments A, C, and D to decrease the segment temperatures and less current will be diverted to the segment B control loop to increase the segment temperature. For this illustration, assume that the current increase in segments A, C, and D is one unit to 10, 3, and 1, respectively, and the current shunted through the segment B control loop is reduced to 4. These new currents will be used to calculate the current control errors for the next operating cycle.

Subsequent Cycles—It is apparent from this example that, as the individual segment temperature changes, the primary controller will continue to adjust bushing current to maintain the average bushing temperature at the desired value. In addition, the current control error sequence will continue to adjust the amount of current diverted by each individual bushing segment control loop. As a result, this interactive process will continue to drive the control of the bushing to a condition such that:
1) the actual average temperature equals the desired average temperature,
2) at least one current set point equals 0,
3) the remaining current set points are greater than 0, and
4) each current error equals 0.

Regardless of whether the bushing balance controller is operating by current or temperature control, once the control errors are calculated, the program then determines the triac firing sequence so as to divert the correct amount of current to the segment control loop of each individual bushing segments to provide the required bushing segment temperature.

The present invention provides a bushing balance controller which uses either temperature or current control of individual bushing segments depending on the status of the temperature sensors monitoring the bushing. Either type of control can be used independently from the other to control the bushing temperature, although in the preferred embodiment of the invention they are integrated such that the current control will operate only if the controller senses a malfunction in the temperature sensors. More particularly, the bushing uses temperature control when all temperature sensors are operating within the monitored temperature range. In the event of a failure of a thermocouple, the controller automatically switches to current control as a back-up mode of operation. Although the controller can be programmed to automatically switch back to temperature control when the inoperative thermocouple again begins to operate, in the preferred embodiment of the invention, the return to temperature control requires the intervention of a human operator to protect against intermittent thermocouple failure and resulting erratic bushing operation.

The forms of this invention shown and described in the disclosure represent illustrative preferred embodiments and it is understood that various changes may be made without departing from the scope of the present invention as defined by the claims that follow.

I claim:

1. In a method of controlling the temperature of a glass fiber forming bushing having multiple bushing segments, while feeding molten glass to and through said bushing and drawing glass fibers from said bushing, the method comprising:
   a. establishing a temperature set point for each bushing segment and a desired average temperature for said bushing;
   b. supplying electrical current to said bushing;
   c. diverting a portion of said current from each of said bushing segments;
   d. measuring the actual temperature of each bushing segment;
   e. calculating the actual average temperature of said bushing;
   f. comparing said desired average bushing temperature to said actual average bushing temperature;
   g. adjusting current to said bushing in response to said comparison;
   h. summing said temperature set points;
   i. modifying each of said segment temperature set points by increasing said temperature set points for each bushing segment by an equal amount, the temperature set point increase being the same for each segment, if said sum of said temperature set points is less than zero and reducing said temperature set points for each of said segments by an equal amount, the temperature set point decrease being the same for each segment, if said sum of said temperature set points is greater than zero;
   j. determining an error signal for each of said bushing segments as the difference between said actual temperature of said bushing segment and the sum of said temperature set point for said bushing segment and said actual average temperature;
   k. varying the current to selected ones of said bushing segments by increasing the portion of said current diverted from each of said selected ones of said bushing segments having an error signal greater than zero and decreasing the portion of said current diverted from each of said selected of said bushing segments having an error signal less than zero; and
   l. repeating steps d. through k. based on said temperature set point as modified in step i.

2. The method as in claim 1 wherein said current adjusting step includes increasing to said bushing when said actual average temperature is less than said desired average temperature and reducing current to said bushing when said actual average temperature is greater than said desired average temperature.

3. The method as in claim 1 wherein said current varying step further includes diverting said current from a maximum of one less than the total number of bushing segments.

4. The method as in claim 1 wherein said current varying step further includes synchronizing said diverting of said current from said bushing segments with said supplying of current to said bushing.

5. The method as in claim 1 wherein said repeating step includes repeating steps d. through k. until said actual average temperature equals said desired average temperature, said sum of said temperature set points equal zero and error signal for each of said bushing segments equals zero.

6. In a method of controlling the temperature of a glass fiber forming bushing having multiple bushing segments, while feeding molten glass to and through said bushing and drawing glass fibers from said bushing, the method comprising:
   a. establishing a current set point for each bushing segment and a desired average bushing temperature;
   b. supplying electrical current to said bushing;
   c. diverting a portion of said current from each of said bushing segments;
   d. measuring the actual temperature of each bushing segment;
   e. calculating the actual average temperature of said bushing;
   f. comparing said desired average bushing temperature to said actual average bushing temperature;
   g. adjusting current to said bushing in response to said comparison;
   h. modifying said current set points by increasing said current set points for each bushing segment by an equal amount, the current set point increase being the same for each segment, if any of said current set points is less than zero and decreasing each current set point by an equal amount, the current set point decrease being the same for each segment, if all of said current points are greater than zero;
   i. measuring current through each of said bushing segments;
   j. determining a current error signal for each of said segments as the difference between said measured current and said current set point;
   k. varying the current to selected ones of said bushing segments by increasing the portion of said current diverted from each of said selected ones of said bushing segments having an error signal less than zero and decreasing the portion of said current diverted from each of said selected ones of said bushing segments having an error signal greater than zero; and
   l. repeating steps d. through k. based on current set points as modified in step h.

7. The method as in claim 6 wherein said current adjusting step includes increasing current to said bushing when said actual average temperature is less than said desired average temperature, and decreasing current to said bushing when said actual average temperature is greater than said desired temperature.

8. The method as in claim 6 wherein said current varying step further includes diverting said current from a maximum of one less than the total number of bushing segments.

9. The method as in claim 6 wherein said current varying step further includes synchronizing said diverting of said current from said bushing segments with said supplying current to said bushing.

10. The method as in claim 6 wherein said repeating step includes repeating steps d. through k. until said actual average temperature equals said desired average temperature, at least one of said current set points equals zero while the remaining current set points are greater than zero and each current error signal equals zero.

11. In a method of controlling the temperature of glass fiber forming bushing having multiple bushing segments, while feeding molten glass to and through said bushing and drawing glass fibers from said bushing, the method comprising:
 a. establishing a temperature set point and current set point for each bushing segment and a desired average temperature for said bushing;
 b. supplying electrical current to said bushing;
 c. diverting a portion of said current from each of said bushing segments;
 d. measuring the actual temperature of each bushing segment;
 e. determining the number of bushing segments having an actual temperature greater than or equal to a predetermined control value; and
 f. performing steps g. through n. when all of said actual bushing segment temperatures are greater than or equal to said predetermind value and performing steps o. through v. when any of said actual average bushing segment temperatures is less than said predetermined value, wherein steps g. through v. include;
 g. calculating the actual average temperature of said bushing;
 h. comparing said desired average bushing temperature to said actual average bushing temperature;
 i. adjusting current to said bushing in responce to said comparison;
 j. summing said temperature set points;
 k. modifying each of said segment temperature set points by increasing said temperature set points for each bushing segment by an equal amount, the temperature set point increase being the same for each segment, if said sum of said temperature set points is less than zero and reducing said temperature set points for each of said segments by an equal amount, the temperature set point decrease being the same for each segment, if said sum of said temperature set points is greater than zero;
 l. determining an error signal for each of said bushing segments as the difference between said actual temperature of said bushing segment and the sum of said temperature set point for said bushing segment and said actual average temperature;
 m. varying the current to selected ones of said bushing segments by increasing the portion of said current diverted from each of said selected ones of said bushing segments having an error signal than zero and decreasing the portion of said current diverted from each of said selected ones of said bushing segments having an error signal less than zero; and
 n. repeating steps d, e and f;
 o. calculating the actual average temperature of said bushing based on said segments having an actual temperature greater than or equal to said predetermind control value;
 p. comparing said desired average bushing temperature to said actual average said bushing temperature;
 q. adjusting current to said bushing in response to said comparison;
 r. modifying said current set points by increasing said current set points for each bushing segments by an equal amount, the current set point increase being the same for each segment if any of said set points is less than zero and decreasing each set point by an equal amount, the current set point decrease being the same for each segment, if all of said current set points are greater than zero;
 s. measuring current through each of said segments;
 t. determining a current error signal for each of said segments as the difference between said measured current and said current set point;
 u. varying the current to selected ones of said bushing segments by increasing the portion of said diverted from each of said selected ones of said bushing segments having an error signal of less than zero and decreasing the portion of said current diverted from each of said selected ones of said bushing segments having an error signal greater than zero; and
 v. repeating steps d, e and f.

* * * * *

UNITED STATES PATENT AND TRADEMARK OFFICE
CERTIFICATE OF CORRECTION

PATENT NO. : 5,071,459

DATED : December 10, 1991

INVENTOR(S) : John J. Kuhn

It is certified that error appears in the above-indentified patent and that said Letters Patent is hereby corrected as shown below:

Claim 1, column 15, line 42, between the words "set" and "for", delete the "s" in "points" to read as --point--.

Claim 2, column 15, line 67, insert --current-- between "increasing" and "to".

Claim 11, column 17, line 32, change "predetermind" to read as --predetermined--.

Claim 11, column 17, line 41, change "responce" to read as --response--.

Claim 11, column 17, line 45, between the words "set" and "for", delete the "s" in "points" to read as --point--.

Claim 11, column 18, line 13, insert --greater-- between "signal" and "than".

Claim 11, column 18, line 20, change "predetermind" to read as --predetermined--.

Claim 11, column 18, line 29, change "segments" to read as --segment--.

Claim 11, column 18, line 31, insert --,-- after "segment".

Claim 11, column 18, line 36, insert --bushing-- between "said" and "segments".

Claim 11, column 18, line 41, insert --current-- between "said" and "diverted".

Signed and Sealed this

Second Day of September, 1997

BRUCE LEHMAN

*Attest:*

*Attesting Officer*

Commissioner of Patents and Trademarks